(12) United States Patent
Rennesund et al.

(10) Patent No.: US 6,627,083 B2
(45) Date of Patent: Sep. 30, 2003

(54) LIGHT EXPANDED CLAY AGGREGATES FOR PHOSPHOROUS REMOVAL

(75) Inventors: Roy Rennesund, Auli (NO); Petter Deinboll Jenssen, Ås (NO); Tore Krogstad, Ås (NO)

(73) Assignee: A.S. Norsk Leca, Lillestrom (NO)

( * ) Notice: Subject to any disclaimer, the term of this patent is extended or adjusted under 35 U.S.C. 154(b) by 0 days.

(21) Appl. No.: 09/788,356

(22) Filed: Feb. 21, 2001

(65) Prior Publication Data
US 2002/0179534 A1 Dec. 5, 2002

Related U.S. Application Data

(62) Division of application No. 09/068,217, filed as application No. PCT/NO97/00270 on Oct. 7, 1997, now abandoned.

(30) Foreign Application Priority Data

Oct. 7, 1996 (NO) ................................................ 964261

(51) Int. Cl.$^7$ ................................................. C02F 1/42
(52) U.S. Cl. ................................................. 210/660
(58) Field of Search ........................... 210/660, 198.1

(56) References Cited

U.S. PATENT DOCUMENTS

| 4,402,833 A | * | 9/1983 | Bennett et al. | 210/667 |
| 5,271,848 A | * | 12/1993 | Smith et al. | 210/702 |
| 5,368,741 A | * | 11/1994 | Munday et al. | 210/724 |

FOREIGN PATENT DOCUMENTS

JP 61-82841 * 4/1986

* cited by examiner

Primary Examiner—Chester T. Barry
(74) Attorney, Agent, or Firm—Nath & Associates PLLC; Gary M. Nath; Joshua B. Goldberg

(57) ABSTRACT

Sintered light expanded clay aggregates are described that are prepared by expanding and firing a clay-based material, and where the finished aggregates have a diameter of up to about 32 mm, for use as filtration medium for purifying water, wherein carbonates of calcium and/or magnesium are added to the clay as flux material prior to expansion and firing. Uses of the expanded clay aggregates for removing phosphorous by utilising die clay aggregates are also described, as well as a method for removing phosphorus by using the clay aggregates.

11 Claims, 4 Drawing Sheets

LIGHT EXPANDED CLAY AGGREGATES FOR PHOSPHOROUS REMOVAL

This application is a divisional application of U.S. patent application Ser. No. 09/068,217, filed Jul. 16, 1998, which is a 371 of PCT/NO97/00270 filed Oct. 7, 1997 the entire contents of which are hereby incorporated in their entirety now abandoned.

The present invention relates to lightweight clinker with added carbonates of calcium and/or magnesium, for example, dolomite, and the use of such an aggregate for removing phosphorus from, for example, waste water.

Recent years have seen an increase in water purification requirements in the light of growing environmental awareness. Existing treatment plants for removing organic material from water do not, however, remove phosphorus. To remove phosphorus additional purification is necessary in order to bring the amount down to an environmentally acceptable level.

Methods are known involving the use of aluminum or iron salts, lime, or magnesium or calcium oxide. For example, U.S. Pat. Nos. 5,368,741 and 4,402,833 describe the addition of $Ca(OH)_2$ to a settling tank in order to bind and precipitate phosphorus from waste water.

Moreover, it is known from U.S. Pat. No. 5,271,848 to allow polluted water to flow through a layer of bauxite powder or gravel to remove phosphorus. If the gravel is crushed too finely, thus obtaining a large surface and so great reactivity, the hydraulic properties of the mass will be reduced.

Moreover, so-called artificial wetlands are known that are constructed in the form of a bounded permeable earth medium planted with marsh vegetation, through which earth medium the phosphorus-containing waste water, from which most other organic materials have been removed, is filtered. Such plants are described, for example, in a paper read at a symposium of the Norwegian Water Federation (Norsk Vannforening) on Oct. 14, 1991 by Petter D. Jenssen and Trond Maeluum.

A disadvantage of such plants has often been that insufficient attention has been paid to the hydraulic conductivity of the earth medium, i.e., the capacity of the earth medium to conduct water, so that the water is not pressed up and flows over the surface. To achieve sufficiently high phosphorus binding it has in fact been necessary to use sand with a very large specific surface, i.e., sand having very small particles. Sand of this kind has very poor hydraulic conductivity.

It is also known to use light expanded clay aggregates (such as LECA) to improve the hydraulic conductivity of the earth medium. These clay aggregates have also been found to have a certain capacity for removing phosphorus, which is due in part to the fact that during production these balls are often powdered with dolomite in the firing zone for production-technical reasons. The phosphorus binding capacity of these clay aggregates is however not sufficiently great, thus making it is desirable to have a medium having greater capacity for binding phosphorus.

It is an object of the present invention to find a material for use as a filtration medium for purifying water which has a considerably greater capacity for removing phosphorus than the previous expanded clay aggregates, whilst having the same good hydraulic properties as this previously known material.

According to the invention, this is achieved by means of sintered light expanded clay aggregates, characterised in that prior to expansion and firing carbonates of calcium and/or magnesium are added to the clay as flux material.

With the aid of the present sintered light aggregates it has been possible to combine a high phosphorus binding capacity with very good hydraulic conductivity. The sintered light expanded clay aggregates are balls having a large specific internal surface in the form of internal cavities in the configuration of small cells which are interconnected. The reactive carbonates of calcium and magnesium contained in the matrix are spread over this large internal surface and provide a very large phosphorus binding capacity.

The sintered light expanded clay aggregates are ceramic matrices, which affords the material the strength to ensure that it retains its hydraulic conductivity. In this way it is ensured that the water which is to be purified has good contact with the reactive substances in the matrix and that the reactive substances are distributed in the system in an expedient and optimal fashion The capacity of the present sintered light aggregates to bind phosphorus is also dependent upon a large specific surface, but this large specific surface is obtained in that the internal surface in the light aggregates is also accessible to the water. In the case of previous plants based on sand, it has been necessary to use sand having very small particles in order to obtain a sufficiently great specific surface, which has resulted in an excessively low hydraulic conductivity.

The sintered light aggregates according to the present invention are made following a conventional method for manufacturing light, expanded clay aggregates (Leca), in that marine clay is treated by a process wherein the clay is fed into a rotary kiln where it is first shaped into clay pellets which are fired and finally expanded at a temperature increasing up to about 1200° C. in the firing zone. In this way an approximately ball-shaped granulate having a ceramic shell around a porous core is formed. The clay aggregates according to the present invention are prepared in essentially the same way except that prior to granulation and firing carbonates of calcium and/or magnesium, e.g., dolomite, are added to the clay.

Light expanded clay aggregates are ceramic products which upon exiting the kiln are approximately ball-shaped and normally have a diameter within the range of about 0 to 32 mm. The sintered light clay aggregates have an internal structure with a large number of air bubbles in a matrix of fired clay. The outer surface is relatively dense and forms a barrier against free flow of fluids from the surroundings into the ball.

To ensure that the internal surface of the sintered light aggregates is accessible to the water that is to be purified, the balls are preferably cracked prior to use. The word "cracking" is used here as distinct from crushing, since cracking divides up a smaller number of bits and large amounts of excessively small particles are not formed. In this way it is ensured that the water is not prevented from reaching the internal surfaces of the balls' surface. The cracked light aggregate balls still have such large particle size that the hydraulic conductivity through a tank containing particles of this type is high, whilst the water flowing through encounters a large effective surface which, in addition to the outer surface shell of the balls, also consists of the internal surfaces in the expanded clay aggregates. To ensure this, it is preferred that the cracked clay aggregates have a size distribution of 1 to 10 mm, preferably 1 to 4 mm, and most preferably 2 to 4 mm. A small amount of more finely grained material may also be present, but this material is preferably sieved out as it may prevent through-flow in the filter.

A second object of the invention is to provide an improved method for removing phosphorus from water.

Thus, a method is provided for removing phosphorus from water, such as waste water, where the water is filtered through a filtration medium which retains phosphorus, where as filtration medium sintered light expanded clay aggregates are used that are produced by expansion and firing of a clay-based material and where the finished aggregates have a diameter of up to about 32 mm, and where, prior to expansion and firing, carbonates of calcium and/or magnesium are added to the clay as flux material.

The invention will now be described with reference to the appended figures, wherein.

Figure 1:
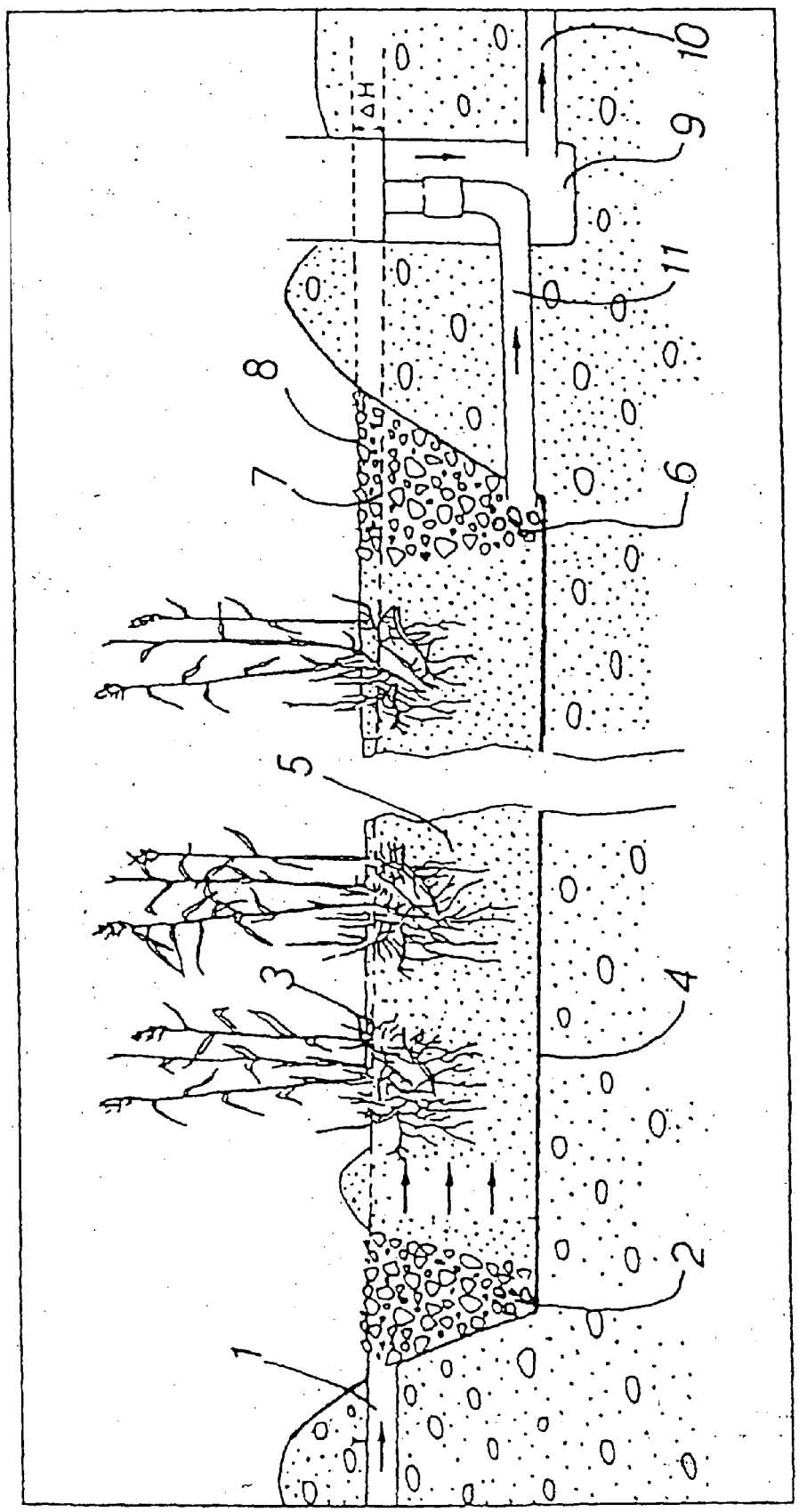
FIG. 1 shows a cross-section through a constructed wetland.

A typical artificial wetland is illustrated in FIG. 1. The artificial wetland has an inlet 1 and an inlet zone 2 consisting chiefly of relatively coarse grit or gravel. The whole of the artificial wetland is surrounded by an impermeable bottom 4 of clay or a membrane. The outlet 11 is located as far away as possible from inlet 1 and there is also a zone 6 having grit or gravel drainage around outlet 11. The rest of the mass in the artificial wetland consists of a filter material 5, and on the top of this zone plants 3 may be provided, for example, reeds of the species Phragmites australis or similar marsh plants. The outlet 11 leads to an outlet basin 9 with level control which ensures that the water level 7 remains below the surface of the earth medium. The water from the plant runs out through run-off 10 and this water may thus be of bathing quality.

The present expanded lightweight clinker provides major advantages when it is used as filtration medium 5. This is ascribable to the fact that the expanded lightweight clinker according to the present invention combines outstanding hydraulic conductivity with a very great capacity for binding phosphorus. For many years expanded clay aggregates have been used in artificial wetlands of this kind, but they have not shown a sufficiently great capacity to take up phosphorus. By adding carbonates of calcium and/or magnesium as flux material during the production of the expanded clay aggregates, the capacity of these clay aggregates to bind phosphorus increases sharply, whilst the hydraulic conductivity of the product is maintained.

EXAMPLE 1

To test the capacity of the present expanded clay aggregates to bind phosphorus, material was produced having different flux of calcium carbonate or dolomite.

Dolomite was also used with two different size fractions to see how this affected the adsorption of phosphorus.

Figure 2A:
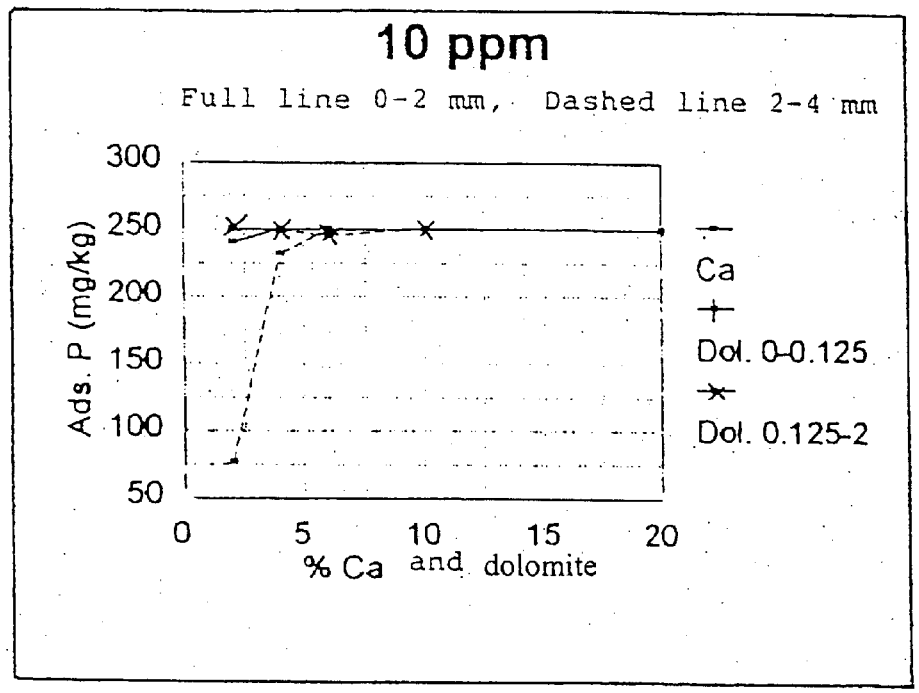
FIG. 2 shows adsorption of phosphorus as a function of the calcium carbonate and dolomite content of the lightweight clinker, respectively.
Figure 2B:
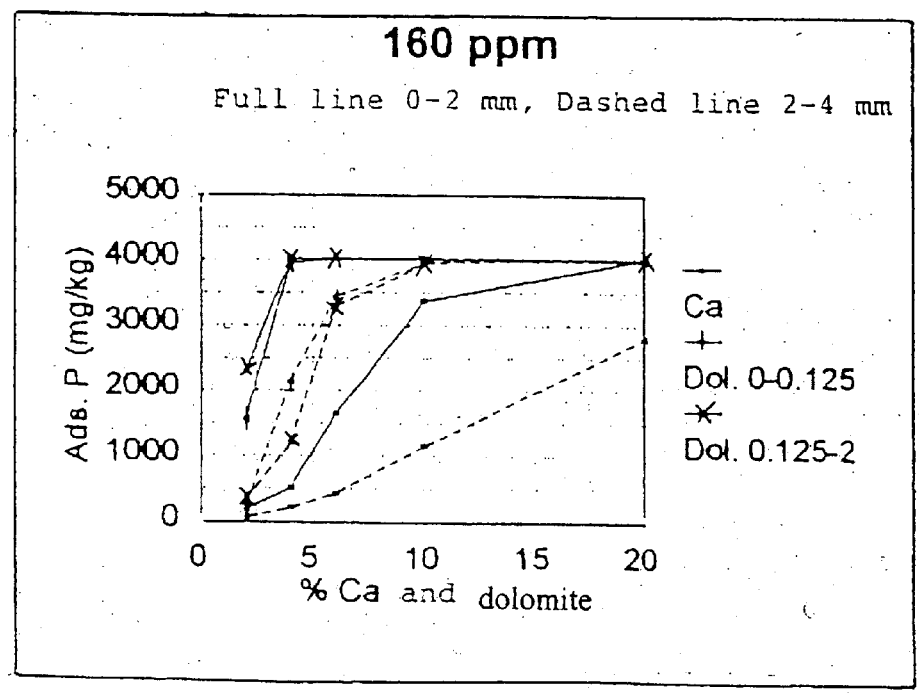

FIG. 2 shows adsorption of phosphorus on the present expanded sintered clay aggregates with different additives of calcium carbonate and dolomite, with a different grading curve for the filter material and also for two different concentrations of phosphorus in the water.

Clay aggregates to which calcium carbonate and dolomite have been added show at an added amount (% dry weight) of flux material of more than 7% roughly the same capacity for absorption of phosphorus in the case of water containing 10 ppm phosphorus, which corresponds to the phosphorus content in normal waste water. In the case of a flux material content of less than 7%, the cracked clay aggregates in the size range of 2 to 4 mm containing dolomite seem to adsorb much more than those containing calcium carbonate.

The measurements for water containing 160 ppm phosphorus reveal a greater difference between calcium carbonate and dolomite. Calcium carbonate was less effective than dolomite, especially in the case of the size range 2 to 4 mm of the cracked clay aggregates. At a content of more than 10% dolomite in the clay aggregates the adsorption is as great for both the tested size distributions of cracked clay aggregates, whereas calcium carbonate adsorbed considerably less.

In the tests which are presented in the form of graphs in FIG. 2, attempts were also made with different grain size of the flux material of dolomite, namely 0–0.125 mm and 0.125–2 mm. It was anticipated that the most finely grained material would be more exposed at the surfaces, the internal and external surfaces in/on the clay aggregates. This did not seem to be the case and may in part be attributable to the decomposition of the dolomite which takes place during the firing of the clay aggregates.

EXAMPLE 2

A number of tests were made to show how an increased amount of flux material of dolomite in addition to that in FIG. 2 affected the adsorption of P and how important the pH is for the retention of P in a purification system where the clay aggregates are used to bind phosphorus.

Figure 3A:
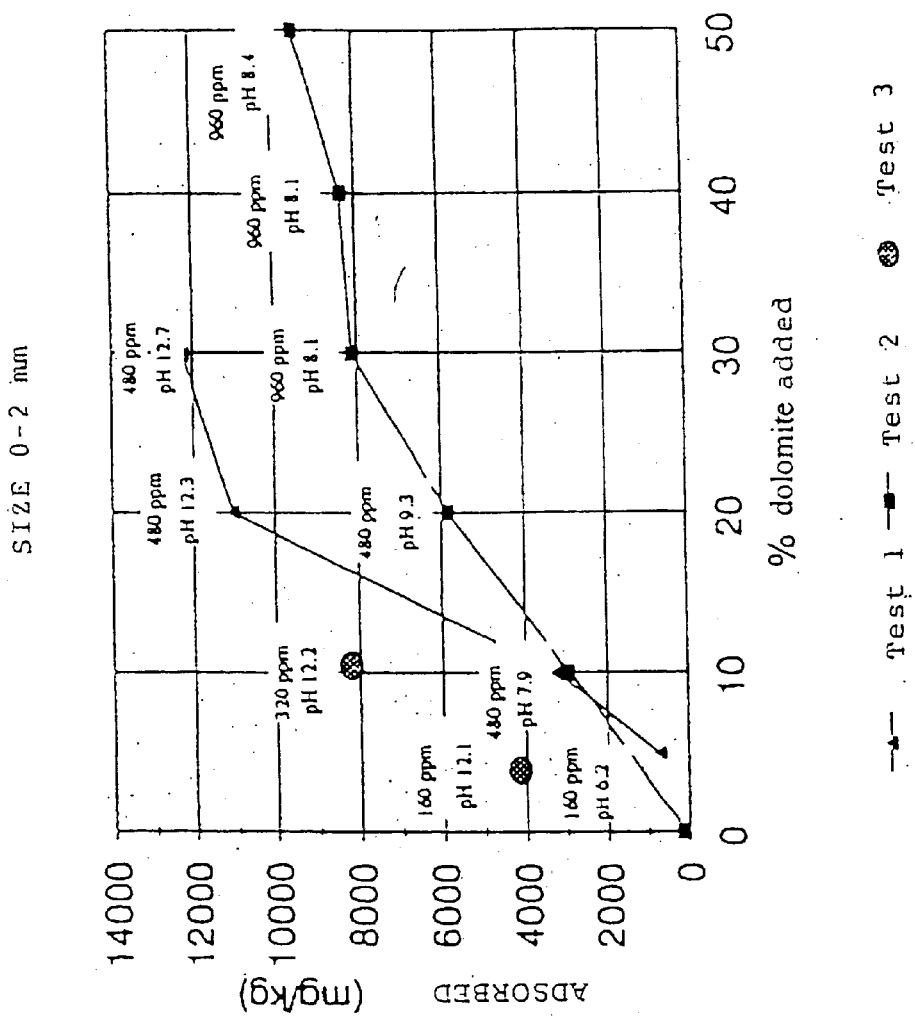
FIG. 3 shows absorption of phosphorus as a function of % by weight dolomite added as a flux material and P concentration in water.
Figure 3B:
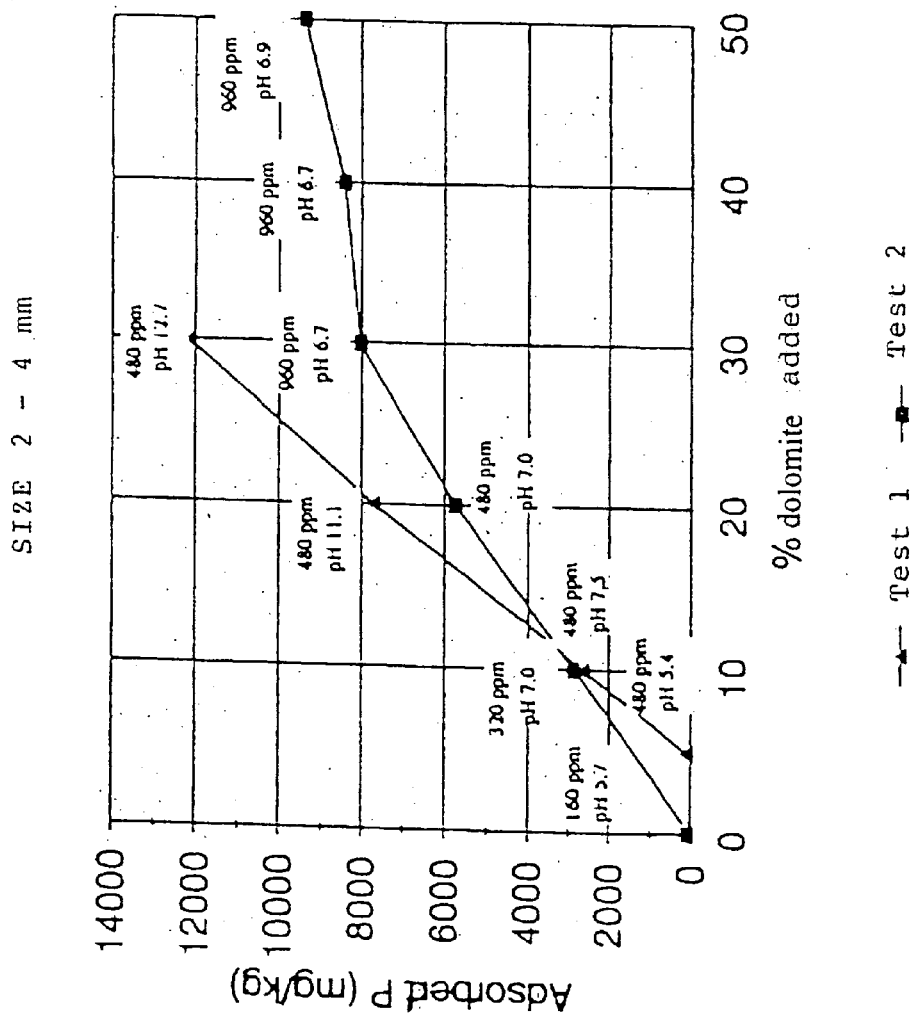

FIGS. 3a and 3b show adsorption of phosphorus in the present expanded sintered clay aggregates where the amount of dolomite added varies from 0 to 50% by weight on the basis of solid matter. The phosphorus concentration in the test varied from 160 to 960 ppm, which also results in variation in the pH in the suspension between clay aggregates and solution.

The results show a clear increase in the adsorption of phosphorus with an increased addition of dolomite of up to 50% by weight. The results also show clearly how important the pH is for phosphorus binding. E.g., when using a phosphorus solution of 480 ppm, the phosphorus adsorption shows an increase from 5846 mg/kg to 11069 mg/kg at an increase of the pH from 9.3 to 12.3. The effect of the pH is also shown by plotting in on FIG. 2a results from other tests using lower phosphorus concentration and higher pH in the solution.

The phosphorus concentrations used here are far higher than what might be expected to occur when using the present clay aggregates, e.g., in a purification plant, whether the water comes from natural run-off or as phosphorus in waste water. The high phosphorus concentrations are used to obtain possibilities for testing the relationship between the amount of dolomite in the clay aggregates and the phosphorus binding potential. The tests give no grounds for drawing conclusions relating to longterm binding of phosphorus, a binding which is usually considerably higher than a laboratory test of this kind can indicate. The true adsorption in a purification plant where the phosphorus concentrations are lower than those used in the tests will probably be considerably higher than these tests have indicated if the pH in the system is maintained at a high level.

The light expanded clay aggregates which were used in the tests had a composition as indicated below in Table 1. After dolomite was added to the clay and the material was well mixed, the clay-based material was used to produce clay aggregates as described above.

TABLE 1

Test firing of Rælingen clay[1] to which dolomite is added

| % by weight of added dolomite | Weight of dry clay (kg) | Weight of dolomite (kg) | Density of finished product (kg/m$^3$) |
|---|---|---|---|
| 0 | 54.74 | 0 | 406 |
| 10 | 81.12 | 8.11 | 422 |
| 20 | 69.27 | 13.87 | 543 |
| 30 | 66.84 | 20.09 | 650 |
| 40 | 74.93 | 29.97 | 709 |
| 50 | 66.00 | 32.97 | 979 |

[1]A clay from Rælingen in eastern Norway

The results in FIGS. 3a and 3b show that aggregates in the range of 0–2 mm have a greater capacity for retaining phosphorus than the aggregates in the range of 2–4 mm. This result may be attributable to the fact that a larger part of the internal surface of the clay aggregates becomes easily accessible when the clay aggregates are cracked. However, when used in a treatment plant there may also be other parameters which must be taken into account. For example, if the material were too finely grained this would have an adverse effect on its hydraulic properties. A good compromise between hydraulic conductivity and exposed surface is obtained when the ready-fired clay aggregates are cracked to a particle size of 0–10 mm. For a number of uses, a more preferred compromise between the aforementioned characteristics is obtained by using cracked clay aggregates in a size fraction of 1–4 mm.

Iron oxide is known to be capable of binding phosphorus strongly and is used in plants for phosphorus removal. However, as flux material in expanded clay aggregates, an addition of iron oxide has little or no effect. Even after reoxidation of the iron subsequent to firing in the reducing atmosphere in which the clay aggregates are fired, the addition of iron has no effect. Such reoxidation also has little effect on ordinary Leca and Leca to which dolomite is added.

The fact that iron as a flux material does not increase the adsorption of phosphorus must be ascribable to the fact that the iron oxide is not exposed on the internal and external surfaces so that the phosphorus does not come into contact with the iron oxide.

After use as a purifying medium, the present light expanded sintered clay aggregates are eminently suitable as an agent for soil enhancement. After the artificial wetland has been used for a number of years, e.g., five years, the filter medium can be removed and ploughed into soil which it is desirable to improve either as it is or after crushing. Phosphorus is so strongly bound to the clay aggregates that there will not be any problematic run-off of phosphorus from the soil. At the same time, phosphorus is so weakly bound that it will be released gradually so that it is accessible to the plants.

What is claimed is:

1. A process for removing phosphorous from phosphorous-containing waste water, said process comprising the steps of:

a) mixing clay and carbonates selected from the group consisting of calcium carbonate, magnesium carbonate, and dolomite to form a mixture;

b) introducing the mixture into a rotary kiln to form pellets;

c) firing and expanding the pellets thereby producing a light expanded aggregate;

d) contacting the light expanded aggregate with the phosphorous-containing water;

wherein the light expanded aggregate has a capacity for adsorption of phosphorous of at least 4000 mg P/kg light expanded aggregate.

2. The process according to claim 1, wherein the carbonates are dolomite.

3. The process according to claim 1, wherein the light expanded clay aggregate has a diameter less than 32 mm.

4. The process according to claim 3, wherein the expanded clay aggregate is broken down to a particle size of less than 10 mm.

5. The process according to claim 3, wherein the expanded clay aggregate is broken down to a particle size of 1–4 mm.

6. The process according to claim 1, wherein the amount of the carbonate added is 5–50% by weight.

7. The process according to claim 1, wherein the amount of the carbonate added is 5–20% by weight.

8. The process according to claim 2, wherein the amount of the carbonate added is 5–50% by weight.

9. The process according to claim 2, wherein the amount of the carbonate added is 5–20% by weight.

10. The process according to claim 1, wherein the light expanded aggregate adsorbs at least 4000 mg P/kg light expanded aggregate.

11. The process according to claim 1, wherein the light expanded aggregate adsorbs at least 1500 mg P/kg light expanded aggregate.

* * * * *